UNITED STATES PATENT OFFICE.

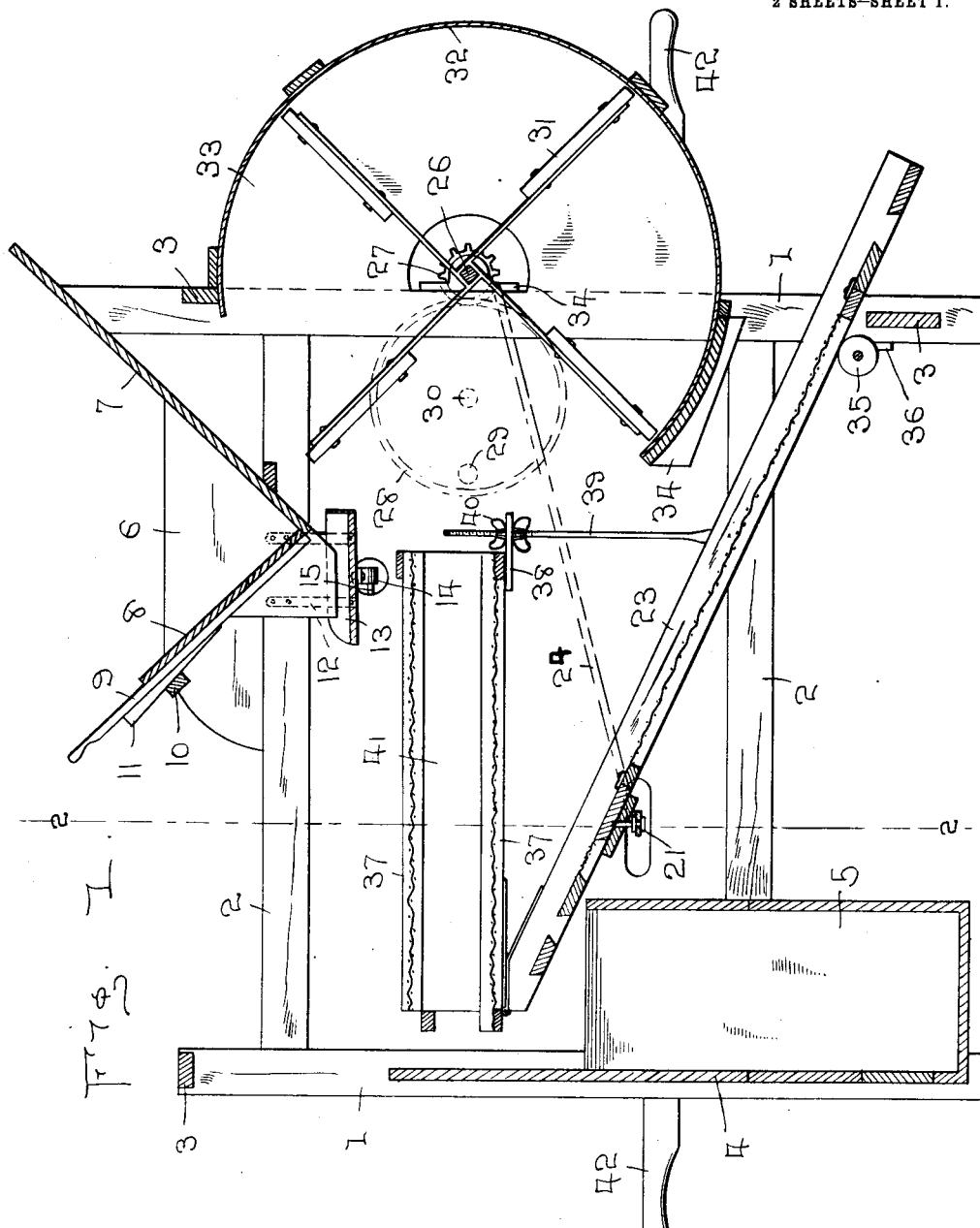

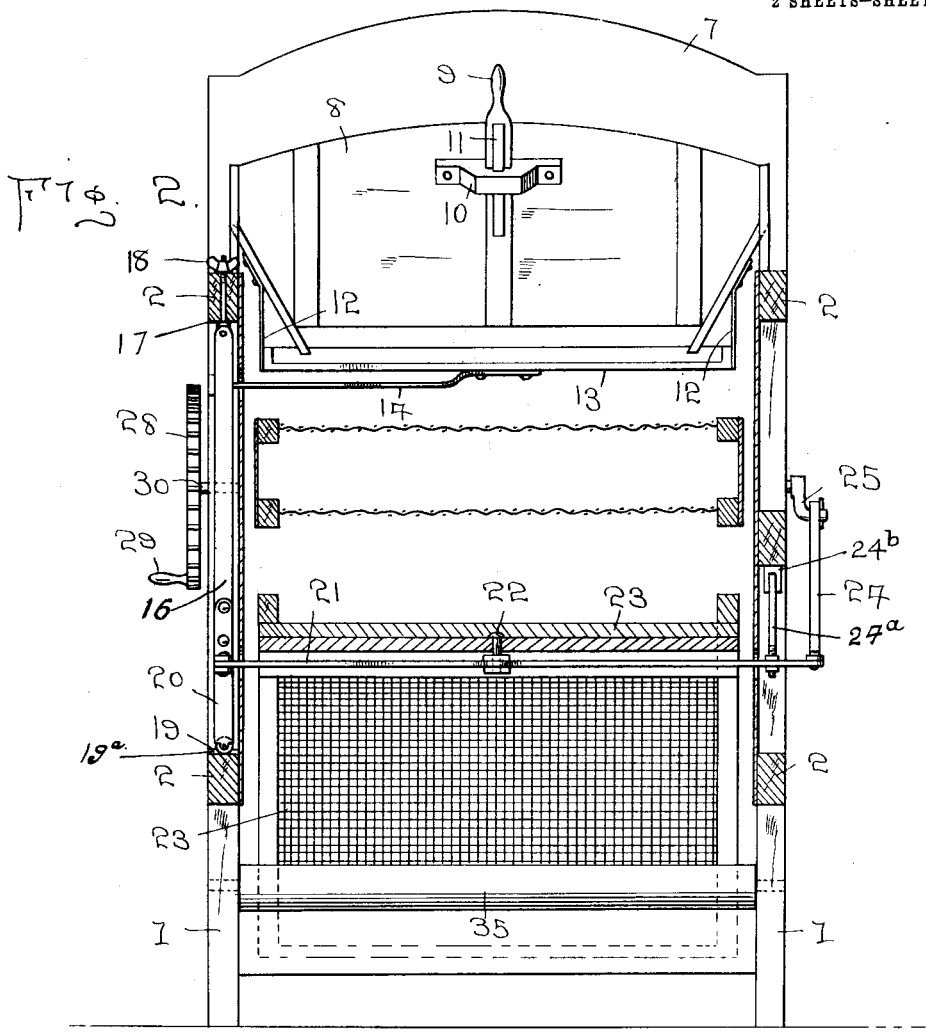
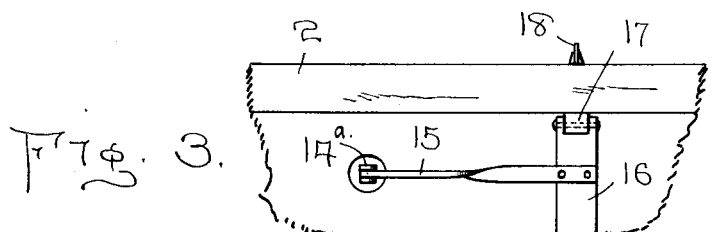

PHILLIP SCHLUND, OF WHEATLAND, WYOMING.

FANNING-MILL AND GRADING-MACHINE.

1,031,092.  Specification of Letters Patent.  Patented July 2, 1912.

Application filed December 27, 1911. Serial No. 668,039.

*To all whom it may concern:*

Be it known that I, PHILLIP SCHLUND, a citizen of the United States, residing at Wheatland, in the county of Laramie and State of Wyoming, have invented certain new and useful Improvements in Fanning-Mills and Grading-Machines; and I do hereby declare the following to be a full, clear, and exact description of the invention, such as will enable others skilled in the art to which it appertains to make and use the same.

This invention relates to grain treating machines and more particularly to grain fanning and grading machines.

An object of the invention is to provide a machine having a plurality of screens and a blower for fanning and grading grain.

Another object is to construct a machine of this character which will thoroughly separate the chaff, etc., from the grain as the same passes through the machine for the purpose of cleaning and grading the same.

Other objects and advantages will be hereinafter referred to and more particularly pointed out in the specification and claim.

In the accompanying drawings which are made a part of this application, Figure 1 is a longitudinal sectional view through the complete machine, Fig. 2 is a cross sectional view on the line 2—2 of Fig. 1, looking toward the front end of the machine, and Fig. 3 is a fragmentary view of the left side of the machine, showing the connection between the vertical hinged bar and the shaker platform beneath the hopper.

Referring more particularly to the drawings in which similar reference numerals designate corresponding parts throughout the several views, 1 represents the corner posts or standards of the framework which are connected by the side pieces 2 and cross pieces 3. The rear standards 1 are also connected by the boards 4 forming the back of the waste box. The slanting bottom 5 of the box has one edge connected with the back 4 and the remainder of the box connected to the slanting bottom 5 and back 4 in any preferred manner. It will be understood that the back 4 extends for some distance above the remainder of the box, between the rear standards 1, the purpose of which will presently appear. It will also be understood that the waste box is positioned in the lower back corner of the framework beneath the rear ends of the screens which will be later fully described.

Secured upon the upper side pieces 2 and connected with the front standards 1 are the boards 6 forming the sides of the hopper of the machine, which hopper has the slanting bottom portions 7 and 8 at right angles to one another. The bottom portion 8 carries a hopper gate 9, the lower edge of which rests against the lower edge of the slanting bottom 7 when said gate is closed. The hopper gate 9 works through a guide block 10 carried upon the under face of the bottom portion 8 and is held in adjusted position by means of the wedge 11 positioned between the gate 9 and the block 10.

Suspended below the lower edge of the hopper, by means of flexible straps 12 is a shaker platform 13 which is adapted for movement transversely of the framework as will be later fully stated. Secured to the under face of the shaker platform, about the center thereof is one end of the platform operating bar 14, the opposite end of which projects through the side of the machine and is bifurcated, as shown at 14ª to receive one end of the connecting rod 15, the opposite end of which is rigid with the vertical hinged link 16. The upper end of the post 16 is hinged to the vertical pin 17 which extends through the upper side pieces 2 and has a thumb nut 18 upon its upper threaded end. The lower end of the link 16 carries a suitable roller 19 for engagement within a suitable guide slot 19ª formed transversely of the upper face of the lower side piece 2.

Secured to the link 16, near the lower end thereof are the L-plates 20, so positioned that one arm of each L-plate is parallel with and adjacent the corresponding arm of the other L-plate and between these arms is pivoted one end of the sieve operating bar 21 which is pivoted at its center, by means of the pivot pin 22, to the under side of the lower slanting sieve 23 a short distance from the upper end of the latter. The opposite end of the sieve operating bar 21 is pivoted to the lower end of the pitman arm 24, the upper end of which is connected to the turned end 25 of the fan shaft 26, and adjacent this end of the bar 21 is connected a lever 24ª which is pivotally secured to an adjacent portion of the frame and serves to support the bar.

The opposite end of the fan shaft 26 carries a small gear wheel 27 which is engaged and rotated by the large gear or drive wheel 28 having a handle 29 by means of which it may be rotated. The gear or drive wheel 28 is carried on a stub shaft 30 suitably mounted in the framework of the machine. The fan shaft 26 has suitable fan blades 31 projecting radially therefrom and protected by the substantially semi-cylindrical fan casing 32 which is provided with heads 33, said casing 32 and heads 33 being suitably secured to the front standards 1 and projecting forwardly of the latter. The shaft 26 passes through the heads 33 and is preferably mounted for rotation in bearing brackets 34 carried upon the front face of the front standards 1.

It will be understood that the fan and fan casing are positioned below the hopper and above the forward end of the slanting sieve 23 and that the casing is only above and below and in front of the shaft 26, all air agitated by the fan blades 31 will be forced rearwardly through the machine. A deflecting plate 34ª is secured to the lower edge of the fan casing 32 and is curved slightly in an upward direction, toward the rear end of the machine and serves to deflect the agitated air and guide the same against the lower end of the slanting sieve 23.

The lower portion of the sieve 23 works over a roller 35 mounted in suitable brackets 36 carried by the forward standards 1 and the lower extremity of this sieve projects forwardly of the forward standards 1 and beneath the fan casing 32. The upper extremity of the sieve 23 is, however, hinged to the rear end of the lower horizontal sieve 37 thus connecting the slanting sieve 23 and the lower horizontal sieve 37. The forward end of the lower horizontal sieve 37 is secured to a plate 38 which is engaged over the upper threaded ends of the supporting rods 39 and held in adjusted position upon the threaded end of said rods by suitable nuts 40. The lower ends of the supporting rods 39 are secured to the sides of the slanting sieve 23.

The lower sieve 37 is spaced below the upper horizontal sieve 37 and connected to the latter by suitable side plates 41. Thus it will be seen that both horizontal sieves 37 are connected to the slanting sieve 23 and supported by the latter. The sieves 37 are of equal length and the forward end of the upper sieve 37 is positioned beneath the rear edge of the shaker platform 13 to receive the grain from said shaker platform. The rear ends of the horizontal sieves 37 and of the slanting sieve 23 are positioned above the waste box and in front of the upwardly extending portion of the back 4 of said box.

It will be understood that the forward end of the shaker platform 13 is closed as well as the sides so that the grain may only drop off of the rear edge of said platform, on to the upper horizontal sieve 37. The complete machine may be readily handled for transportation from place to place by means of the handles 42 projecting from the opposite ends of the framework.

In operation, the grain is placed within the hopper and the hopper gate 9 opened the proper distance and secured in position by the wedge 11 to allow the grain to feed at the proper rate from the hopper on to the shaker platform 13. The drive wheel 28 is then rotated to revolve the gear wheel 27 and fan shaft 26. This operates the fan blades 31, oscillates the screens 23 and 37 longitudinally of the framework by means of the pitman arm 24 connected with the slanting screen shaker bar 21 which in turn is pivoted to the hinged link 16. The movement of the bar 21 will swing the hinged link 16 upon its upper hinged end transversely of the frame, causing the roller 19 to move slightly within the guide slot 19ª in the lower side piece 2. The link 16 causes the connecting rod 15 to move with said link and reciprocate or shake the shaker platform 13 transversely of the framework, by means of the operating bar 14. The shaking of the shaker platform will assist in feeding the grain upon the upper horizontal screen 37 and the shaking of the screens 37 and 23 will assist in separating the grain and foreign particles and in shaking the grain through the screens which may be of the same mesh or of meshes of various sizes, as the occasion may require, the machine being adapted for cleaning, and separating chaff and foreign particles from, the grains of wheat, barley and oats and flax and alfalfa. It will be readily seen that as the fan blades are in motion during the entire operation, they will serve to agitate the air and direct the same toward the rear end of the machine, driving all chaff and foreign particles from the grain during its travel over the hopper to the lower end of the slanting sieve 23, thoroughly cleaning the grain and separating the same from all chaff and foreign particles before said grain leaves the machine. The heavier foreign particles will work toward the rear end of the horizontal screens 37 and drop from the same into the waste box provided for this purpose and the greater part of the chaff will also drop into this box. The upper rear end of the slanting sieve 23 is provided with suitable openings through which foreign particles dropping through the horizontal sieves 37, may fall into the waste box.

What I claim is:—

In a machine of the class described comprising sieves, connections therebetween, a hopper above the sieves, a shaker platform suspended from the hopper to receive the material from the hopper and deposit the same upon the sieves, means for fanning the material deposited upon the sieves, means for operating the fan, a bar pivotally mounted upon the under side of one of the sieves, connections between the fan operating means and said bar for shaking said sieves longitudinally of the frame, connections between said bar and said shaker platform whereby said platform will be moved transversely of the framework.

In testimony whereof I have signed my name to this specification in the presence of two subscribing witnesses.

PHILLIP SCHLUND.

Witnesses:
D. W. BANE,
LENA MOBERLY.

Copies of this patent may be obtained for five cents each, by addressing the "Commissioner of Patents, Washington, D. C."